United States Patent [19]

Ishii et al.

[11] Patent Number: 4,788,478

[45] Date of Patent: Nov. 29, 1988

[54] SPEED CONTROL SYSTEM FOR DC MOTOR

[75] Inventors: Eiichi Ishii; Masuo Osuga, both of Tokyo, Japan

[73] Assignee: NEC Corporation, Tokyo, Japan

[21] Appl. No.: 101,710

[22] Filed: Sep. 28, 1987

[30] Foreign Application Priority Data

Sep. 26, 1986 [JP] Japan .................................. 61-228595

[51] Int. Cl.$^4$ ............................................. H02P 7/285
[52] U.S. Cl. ................................. 318/345 B; 318/331
[58] Field of Search ............... 318/245, 301, 331, 339, 318/342, 343, 345 A, 345 B, 345 AB, 345 F, 345 R

[56] References Cited

U.S. PATENT DOCUMENTS 4,547,715 10/1985 Li ...................................... 318/345 FX

FOREIGN PATENT DOCUMENTS 56-12886 2/1981 Japan ............................... 318/345 B 58-165681 9/1983 Japan .................................... 318/331

Primary Examiner—Bentsu Ro
Attorney, Agent, or Firm—Sughrue, Mion, Zinn, Macpeak, and Seas

[57] ABSTRACT

A speed control system for a DC motor is disclosed. This system includes a first transistor connected between a first terminal and a reference terminal, a second transistor connected between a second terminal and the reference terminal, an error amplifier having first input terminal connected via a reference voltage circuit to the first terminal, a second input terminal connected to a third terminal and an output terminal connected to the bases of the first and second transistors, a first resistor connected between a power terminal and the second terminal, a second resistor connected between the first and third terminals, and a third resistor connected between the second and third terminals, and the motor is connected between the first terminal and the power terminal.

10 Claims, 7 Drawing Sheets

SPEED CONTROL SYSTEM FOR DC MOTOR

BACKGROUND OF THE INVENTION

The present invention relates to a motor control system, and more particularly to a circuit for controlling the rotational speed of a DC motor.

The rotational speed of a DC motor is proportional to the counterelectromotive voltage. Accordingly, the principle for a speed control of a motor is to change a motor driving current in accordance with variation of a motor load and to counteract, by controlling a voltage between terminals of the motor, the variation of a voltage drop across an internal resistance of the motor caused by the change of the motor driving current. Thus, the counterelectromotive voltage of the motor becomes constant, and the rotational speed thereof is stabilized against load variation.

A speed control circuit of a DC motor is based upon the above-mentioned operating principle. However, the control circuit according to prior art has a drawback that the variation of a bias current due to the changes of a power source voltage and/or an operating temperature causes the counterelectromotive voltage of the motor to vary with the result of change in a rotational speed.

SUMMARY OF THE INVENTION

Therefore, an object of the present invention is to provide an improved motor speed control circuit.

Another object of the present invention is to provide a control system for stabilizing a speed of a motor against not only variation in a motor load but also variations in a power source voltage and an operating temperature.

A motor speed control system according to the present invention comprises a DC motor connected between a power source terminal and a first terminal, a resistor connected between the power source terminal and a second terminal, a resistance divider connected between the first and second terminals, a third terminal connected to a dividing point of the resistance divider, a first transistor having a collector-emitter path connected between the first terminal and a reference terminal, a second transistor having a collector-emitter path connected between the second terminal and reference terminal, an error amplifier having first and second input terminals and an output terminal which is connected to the bases of the first and second transistors, means coupled between the first input terminal of the error amplifier and the first terminal for generating a reference voltage thereacross, and means for connecting the second input terminal of the error amplifier to the third terminal.

The reference voltage circuit is provided on the side of the first terminal and is thus disconnected from the second terminal. Accordingly, the counterelectromotive voltage of the motor is stabilized against the variation in a bias current flowing into the reference voltage generating means, so that the rotational speed of the motor is kept constant.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE PRIOR ART

Before describing the embodiments of the present invention, a prior art motor speed control circuit will be described with reference to FIG. 1 to facilitate the understanding of the present invention.

Figure 1:
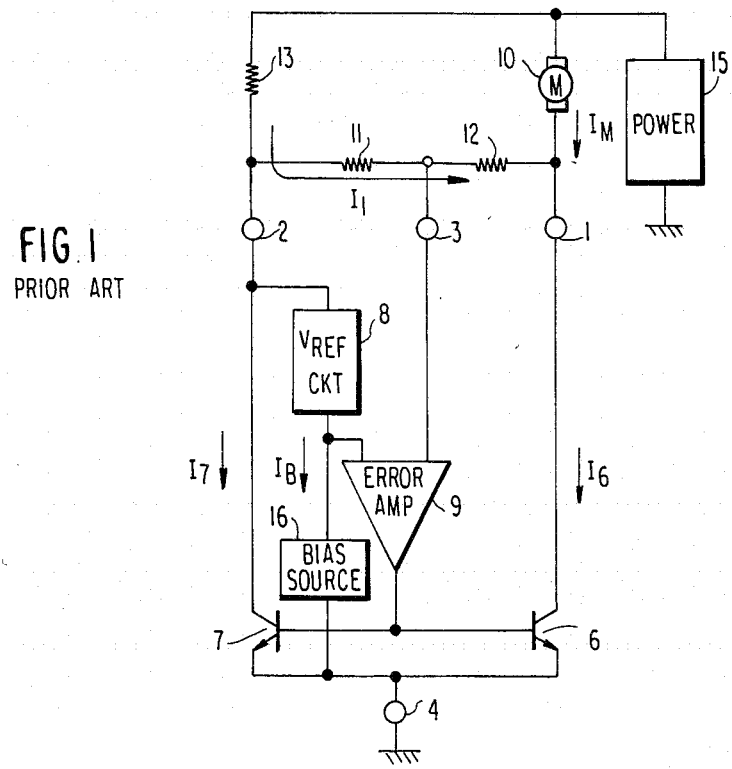
FIG. 1 is a circuit diagram showing a prior art control system.

In FIG. 1, a first transistor 6 for motor driving has its collector-emitter path connected between a first terminal 1 and a reference terminal 4 which is grounded, and a second transistor 7 has its collector-emitter path connected between a second terminal 2 and the reference terminal 4. The second terminal 2 is connected to one input terminal of an error amplifier 9 through a reference voltage circuit 8, and the other input terminal of the error amplifier circuit 9 is connected to a third terminal 3. An output from the error amplifier circuit 9 is applied in common to the bases of the transistors 6 and 7. A DC motor 10 is connected between a power source 15 and the first terminal 1, and a resistor 13 is connected between the power source 15 and second terminal 2. A resistor 11 is connected between the second and third terminals 2 and 3, and a resistor 12 is connected between the first and third terminals 1 and 3. These resistors 11 and 12 constitute a voltage divider. A bias current $I_B$ is applied from an current source 16 to the reference voltage circuit 8 which hence generates a reference voltage thereacross.

In this arrangement, a voltage $V_M$ between terminals of the DC motor 10 is expressed by the following equation (1):

$$V_M = R_M \times I_M + E_a \qquad (1)$$

wherein $R_M$ is the internal resistance of the DC motor 10; $I_M$ is a current flowing through the DC motor 10 (i.e., a motor driving current); and $E_a$ is a counterelectromotive voltage of the DC motor 10.

Since the error amplifier circuit 9 operates to control the base voltages of the transistors 6 and 7 so as to equalize the voltages at the two input terminals thereof, the voltage difference between the terminals 2 and 3 becomes equal to the reference voltage $V_{REF}$ generated by the reference voltage circuit 8. Assuming that the resistance value of the resistor 11 is $R_1$, a current $I_1$ flowing through the resistor 11 is expressed by the following equation (2):

$$I_1 = \frac{V_{REF}}{R_1} \qquad (2)$$

Since an input current of the error amplifier circuit 9 is substantially zero, the current $I_1$ also flows through the resistor 12. Accordingly, the potential difference $V_{2-1}$ between the terminals 2 and 1 is expressed by the following equation (3):

$$V_{2-1} = V_{REF} \times \left(1 + \frac{R_2}{R_1}\right) \quad (3)$$

wherein $R_2$ represents the resistance value of the resistor 12.

The current $I_1$ further flows through the resistor 13. A collector current $I_7$ of the transistor 7 and a bias current $I_B$ produced by the current source 16 also flow through the resistor 13. Therefore, the voltage drop $V_{13}$ across the resistor 13 is expressed by the following equation (4):

$$V_{13} = R_3 \times (I_1 + I_B + I_7) \quad (4)$$

wherein $R_3$ is the resistance value of the resistor 13.

A collector current $I_6$ of the transistor 6 becomes equal to the sum of the motor driving current $I_M$ and the current $I_1$, and is expressed by the following equation (5):

$$I_6 = I_M + I_1 \quad (5)$$

Since the collector current $I_7$ of the transistor 7 is not supplied to the motor 10, the collector current $I_7$ is designed to be $1/K$ (K=positive value) of the collector current $I_6$ of the transistor 6, as expressed by the following equation (6), for purpose of reducing power consumption.

$$I_6 = K \times I_7 \quad (6)$$

Conversely, the resistance value $R_{13}$ of the resistor 13 is designed to be K times as high as that of the internal resistance $R_M$ of the motor 10, as represented by the following equation (7):

$$R_3 = K \times R_M \quad (7)$$

Thus, the following equation (8) is obtained from the above equations (2)–(7).

$$V_M = R_M I_M + K I_B R_M + V_{REF}\left(1 + \frac{R_2 + (1 + K)R_M}{R_1}\right) \quad (8)$$

Accordingly, as is clear from the results of comparison between the equations (1) and (8), the counterelectromotive voltage Ea of the motor 10 is expressed by the following equation:

$$E_a = K I_B R_M + V_{REF}\left(1 + \frac{R_2 + (1 + K)R_M}{R_1}\right) \quad (9)$$

Thus, the counterelectromotive voltage Ea is made constant against the variation in the motor current $I_M$. Namely, even when a load of the motor 10 varies, the rotation speed thereof is kept constant.

However, a relatively large change occurs in the first member $KI_B R_M$ of the right side of the equation (9) due to the variation in the voltage of the power source 15 and/or an operating temperature of the control system, so that the rotation speed of the motor varies. More specifically, the voltage of the power source 15 varies due to a ripple component when it is obtained by rectifying an AC voltage. When a battery is employed as the power source 15, its voltage decreases in accordance with power consumption. The operating temperature varies dependently upon the environmental conditions and further varies due to the heat generation of the transistors 6 and 7. Such variations of power source voltage and/or operating temperature cause the change in the bias current $I_B$ of the bias current source 16. The change in the bias current $I_B$ can be made small, but it is amplified K times, as is apparent from the equation (9). Since the collector current $I_7$ of the transistor 7 is not used for driving the motor 10, the value of K is considerably increased to reduce the power consumption. Consequently, a large variation occurs in the counterelectromotive voltage Ea due to the change of the bias current $I_B$, and the rotation speed of the motor cannot be kept constant.

DETAILED DESCRIPTION OF THE EMBODIMENTS

Figure 2:
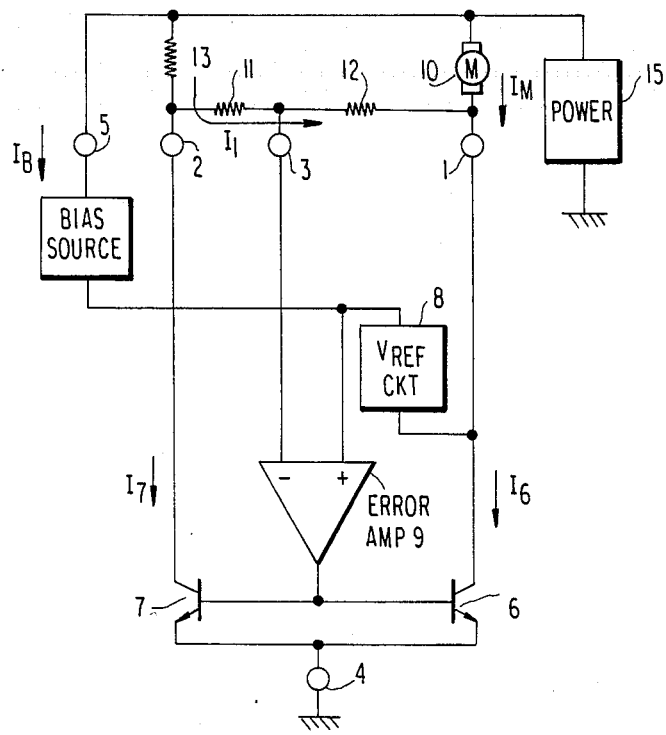
FIG. 2 is a circuit diagram showing a first embodiment of the present invention.

Referring to FIG. 2, there is shown a first embodiment of the present invention, in which the same constituents as those shown in FIG. 1 are denoted by the same reference numerals to omit their further description. In this embodiment, the reference voltage circuit 8 is connected between the first terminal 1 and the non-inverting input terminal (+) of the error or differential amplifier circuit 9, and a terminal 5 connected to the power source 15 is provided as a fifth terminal to disconnect the bias current source 16 from the second terminal 2. The bias current source 16 is connected between the terminal 5 and the reference voltage circuit 8. Accordingly, the bias current $I_B$ is supplied from the power source 15 without flowing through the resistor 13, and then flows into the transistor 6 through the reference voltage circuit 8. As a result, the equations (2) to (5) shown previously are rewritten to the following equations (10) to (13), respectively.

$$I_1 = \frac{V_{REF}}{R_2} \quad (10)$$

$$V_{2-1} = V_{REF} \times \left(1 + \frac{R_1}{R_2}\right) \quad (11)$$

$$V_{13} = R_3 \times (I_1 + I_7) \quad (12)$$

$$I_6 = I_M + I_1 + I_B \quad (13)$$

From the equations (10) to (13), (6) and (7), a voltage $V_M$ between the terminals of the DC motor 10 is expressed by the following equation (14):

$$V_M = R_M I_M + I_B R_M + V_{REF}\left(1 + \frac{R_1 + (1 + K)R_M}{R_2}\right) \quad (14)$$

Thus, the counterelectromotive voltage Ea is represented as follows:

$$E_a = I_B R_M + V_{REF}\left(1 + \frac{R_1 + (1 + K)R_M}{R_2}\right) \quad (15)$$

This voltage Ea is constant irrespective of the variation of the motor current $I_M$. Namely, a stabilized rotational speed of the motor against the load variation is obtained. Moreover, the first member on the right side of the equation (15) does not contain the proportional constant K. Accordingly, even when the bias current $I_B$ varies slightly due to the variation of the voltage of the power source 15 and/or operating temperature, such slight variations are not amplified with K times. As a result, the rotation speed of the motor is also stabilized against the variations in the power source voltage and the operating temperature.

Figure 3:
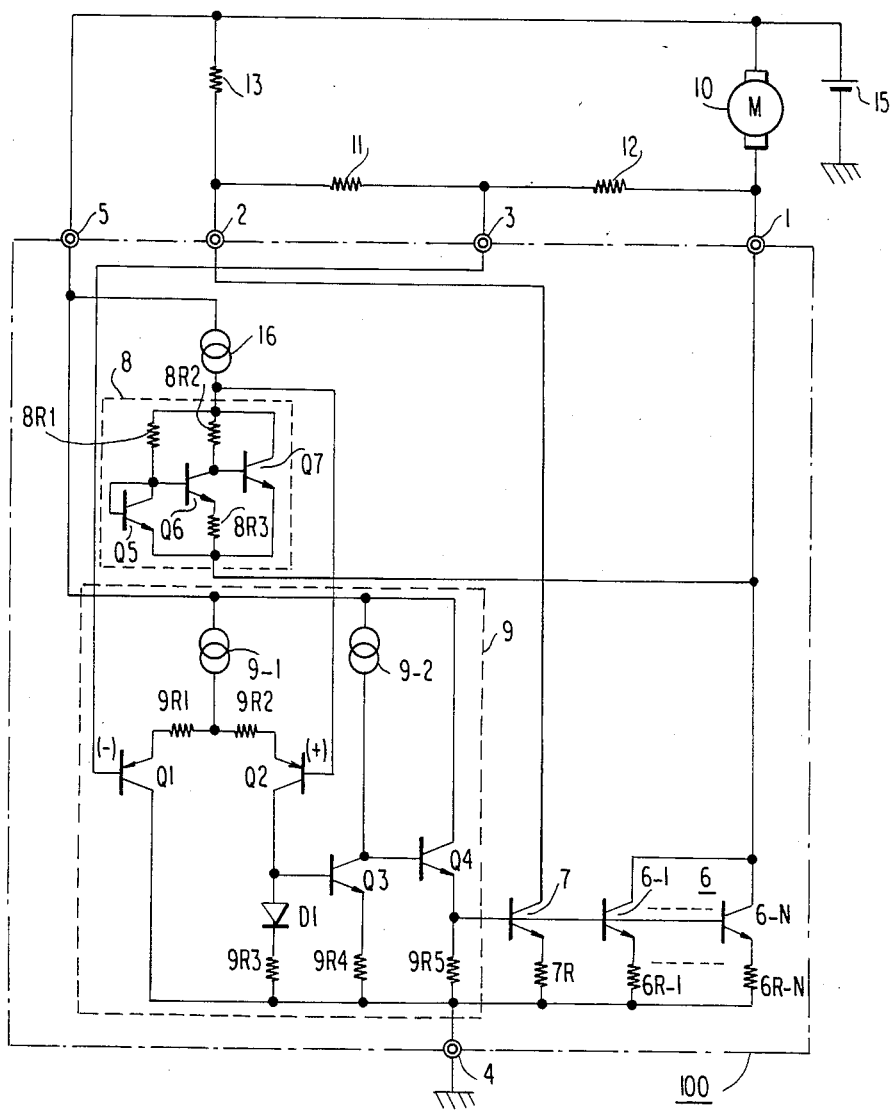
FIG. 3 is a circuit diagram showing the circuit of FIG. 2 in detail.

FIG. 3 shows a detailed circuit construction of the embodiment of FIG. 2, wherein the transistors 6 and 7, the reference voltage circuit 8, the error amplifier 9 and the bias current source 16 are fabricated as a monolithic semiconductor integrated circuit device 100. In order to obtain the relationship of the equation (6), the transistor 6 is formed of a plurality of unit transistors 6-1 to 6-N, and their collector-emitter paths are coupled in parallel, their bases being connected in common. The size of each of unit transistors is equal to the size of the transistor 7. The transistors 6-1 to 6-N and 7 have emitter resistors 6R-1 to 6R-N and 7R, respectively. The reference voltage circuit 8 consists of three NPN transistors $Q_5$ to $Q_7$ and three resistors $8R_1$ to $8R_3$ which are connected as shown in the drawing. This structure is known as a so-called "band gap regulator", which generates a reference voltage of about 1.2 V thereacross. This reference voltage does not change substantially irrespective of the variation in the voltage of the power source 15 and the operating temperature. The error amplifier 9 has two PNP transistors $Q_1$ and $Q_2$ connected in a differential form, the emitters of which are connected to a constant current source 9-1 through the respective emitter resistors $9R_1$ and $9R_2$. The base of the transistor $Q_1$ is connected to the terminal 3 as an inverting input terminal (−), and the base of the transistor $Q_2$ is connected as a non-inverting input terminal (+) to the mode between the bias current source 16 and the reference voltage circuit 8. The collector of the transistor $Q_2$ is connected to the reference terminal 4 through a diode $D_1$ and a resistor $9R_3$, and further to the base of an NPN transistor $Q_3$. The emitter of the transistor $Q_3$ is connected to the reference terminal 4 through a resistor $9R_4$, and the collector thereof is connected to a constant current source 9-2 and the base of an NPN transistor $Q_4$. The collector of the transistor $Q_4$ is connected to the terminal 5, and the emitter thereof is connected to the reference terminal 4 through a resistor $9R_5$. The emitter of the transistor $Q_4$ is led out as an output terminal of the error amplifier 9 and is connected in common to the bases of the transistors 7 and 6-1 to 6-N.

Figure 4:
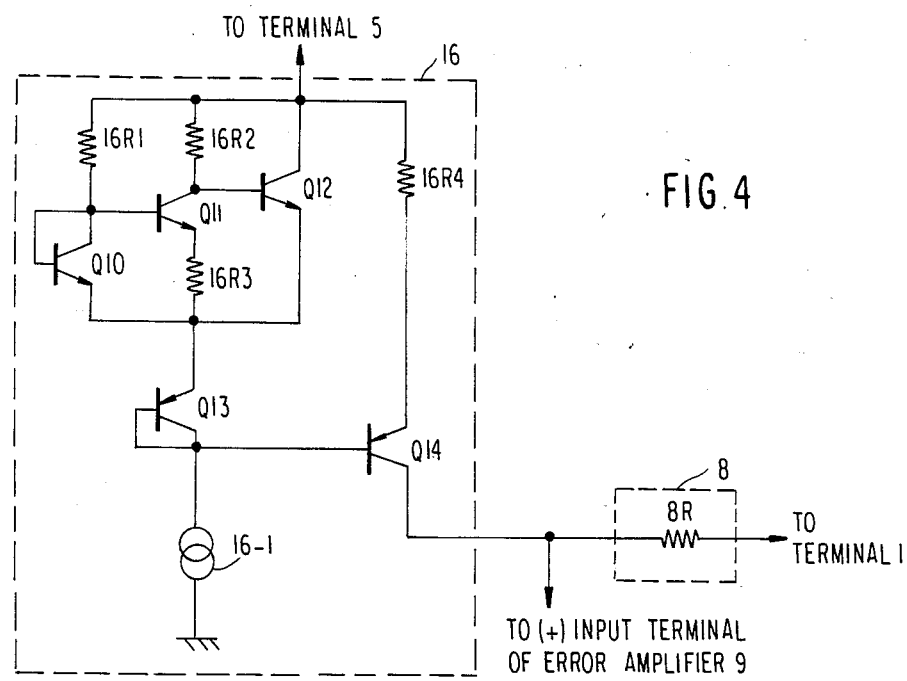
FIG. 4 is a circuit diagram showing another example of the construction of the reference voltage circuit and bias current source shown in FIG. 1.

Another circuit construction of the reference voltage circuit 8 and the bias current source 16 is shown in FIG. 4. In this circuit, the change in the bias current $I_B$ is made small against the variations of the power source voltage and operating temperature. More specifically, the bias current source 16 has a band gap regulator consisting of transistors $Q_{10}$ to $Q_{12}$ and resistors $16R_1$ to $16R_3$, and the regulator is connected in series between the terminals 5 and 4 via a diode-connected transistor $Q_{13}$ and a constant current source 16-1. A transistor $Q_{14}$ and a resistor $16R_4$ are further provided as shown in the drawing. Therefore, assuming that the voltage of the band gap regulator is represented by $V_B$, the bias current $I_B$ takes a value of $V_B/R_{164}$ ($R_{164}$ being a resistance value of the resistor $16R_4$), so that the change of the bias current $I_B$ with respect to the variation in the power source voltage and the operating temperature is reduced to an extremely low level. The reference voltage circuit 8 consists of a single resistor 8R. Accordingly, the reference voltage $V_{REF}$ takes a value of $$V_B \times \frac{R_8}{R_{164}}$$

($R_8$ being a resistance value of the resistor 8R), and it is stabilized against the variation of the power source voltage and the operating temperature. If the resistance values $R_8$ and $R_{164}$ are designed to be $R_8 = R_{164}$, a band gap voltage $V_B$ appears across the resistor 8R.

The transistor $Q_{13}$ may be omitted. In this case, a diode is provided to be connected in series to the resistor 8R in the reference voltage circuit 8.

Figure 5:
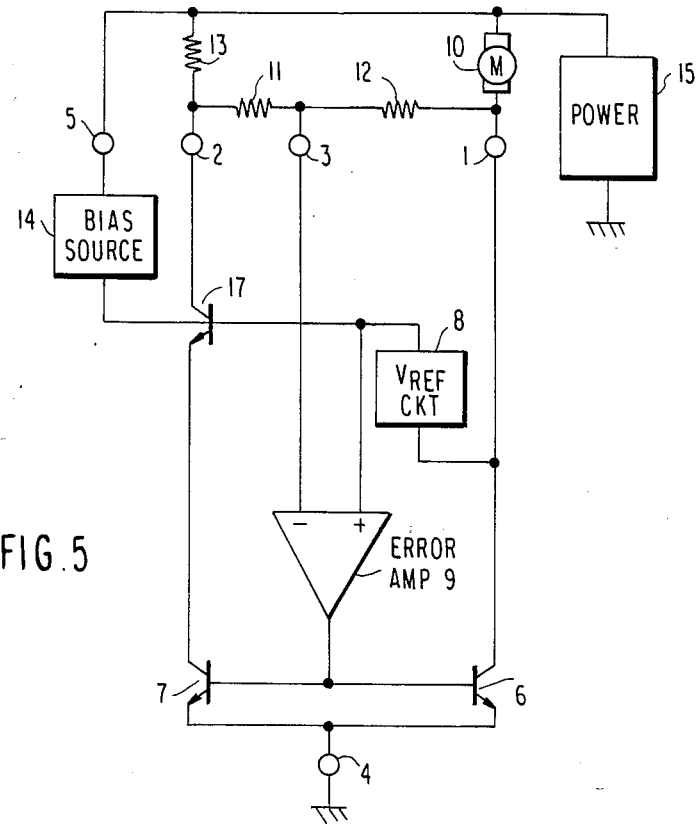
FIG. 5 is a circuit diagram showing a second embodiment of the present invention.

FIG. 5 shows a second embodiment of the present invention, in which the same constituents as those shown in FIG. 2 are denoted by the same reference numerals to omit their explanation. In this embodiment, an NPN transistor 17 is additionally provided. The collector-emitter path of this transistor 17 is inserted between the terminal 2 and the collector of the transistor 7, and the base of the transistor 17 is connected to the node between the reference voltage circuit 8 and the bias current source 14. Accordingly, the collector potential of the transistor 7 differs from the collector potential of the transistor 6 by a level that is equal to a voltage difference between the reference voltage $V_{REF}$ and a base-emitter forward voltage of the transistor 17. In other words, the collector-emitter voltage of the transistor 7 is rendered close to the collector-emitter voltage of the transistor 6, so that the transistor 7 is matched with the transistor 6 to obtain an accurate value of the proportional constant K.

Figure 6:
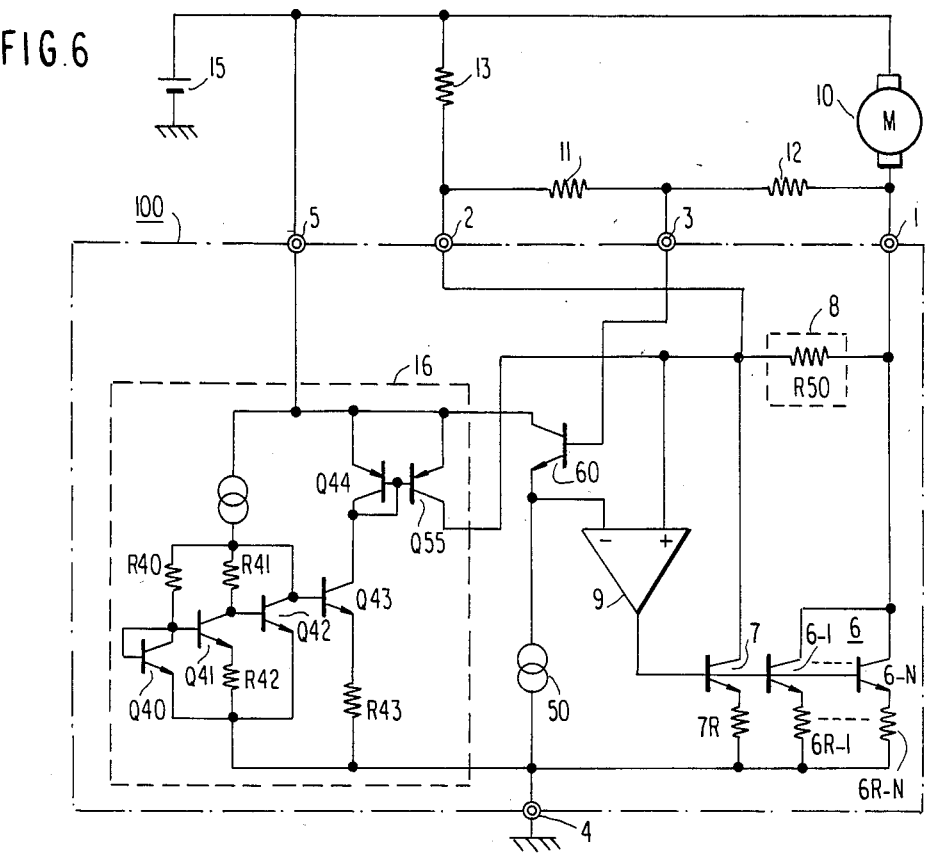
FIG. 6 is a circuit diagram showing a third embodiment of the present invention.

FIG. 6 shows a third embodiment of the present invention. The error amplifier 9 has a substantially identical construction as that shown in FIG. 3, and therefore includes the constant current source 9-1 between the terminal 5 and a node to which the emitters of the transistors $Q_1$ and $Q_2$ are connected in common through resistors $9R_1$ and $9R_2$. In order to expand the input dynamic range of the error amplifier 9, therefore, it is preferable to supply a lowered level of the voltage at the terminal 3 to the inverting input terminal (−) of the error amplifier 9. For this purpose, a transistor 60 and a constant current source 50 are provided as a level-shift circuit. The terminal 3 is connected via the base-emitter path of the transistor 60 to the inverting input terminal (−) of the error amplifier 9. Accordingly, the voltage at the terminal 3 is level-shifted by a base-emitter forward voltage of the transistor 60, and then applied to the inverting input terminal (−) of the error amplifier circuit 9. The constant current source 50 maintains the voltage between the base and emitter of the transistor 60 at a constant level. The bias current source 16 has a band gap regulator consisting of transistors $Q_{40}$ to $Q_{42}$ and resistors $R_{40}$ to $R_{42}$ and connected in series between the terminals 4 and 5 via a constant current source 40. The band gap voltage $V_B$ is supplied to a series circuit consisting of the base-emitter path of a transistor $Q_{43}$ and a resistor $R_{43}$. The transistors $Q_{44}$ and $Q_{45}$ constitute a current mirror circuit in which the ratio of input current to output current is set to 1, and a collector current of the transistor $Q_{43}$ is supplied as an input current for the current mirror circuit. Accordingly, the bias current $I_B$ from the bias current source 16 takes a value of ($V_B - V_{BE43}$)/$R_{43}$, wherein $V_{BE43}$ is the voltage between the base and emitter of the transistor $Q_{43}$. The reference voltage circuit 8 is formed of a single resistor $R_{50}$, the resistance value of which is set to the same level as that of the resistor $R_{43}$. Therefore, a voltage drop ($V_B - V_{BE43}$) occurs across the resistor $R_{50}$. Since the voltage between the base and emitter of the transistor $Q_{43}$ and that between the base and emitter of the transistor $Q_{60}$ are substantially equal, the voltage between the terminals 3 and 1 is maintained at the level of the band gap voltage $V_B$. This voltage is stabilized against the vairations of the power source voltage and operating temperature. Moreover, the change of the bias current $I_B$ become very small.

Figure 7:
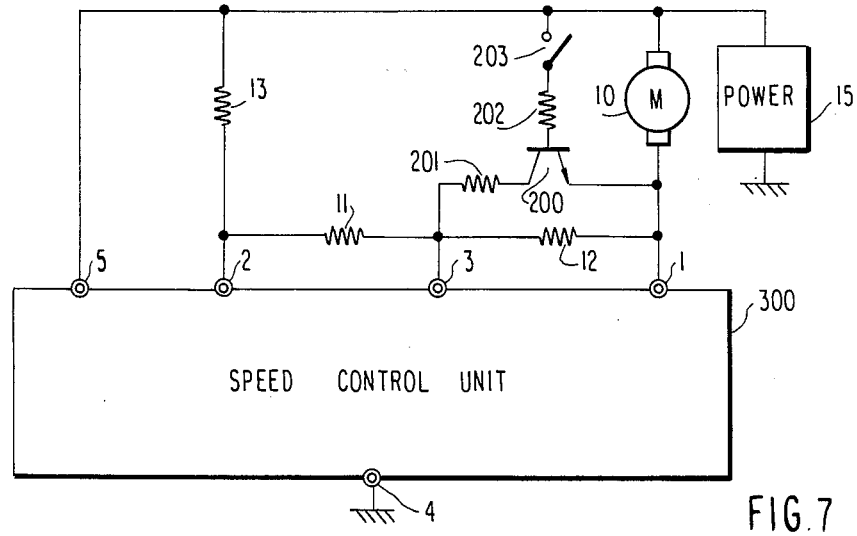
FIG. 7 is a circuit diagram showing one application of the present invention.

FIG. 7 shows an application of the present invention, which can change the rotation speed of the motor 10. A control circuit 300 can employ any one of the structures shown in FIGS. 1, 3, 5 and 6. It is understood from the equation (15) that the counterelectromotive voltage Ea of the motor 10, i.e. the rotational speed thereof, can be switched from one value to another value by changing the resistance value of at least one of the resistors 11 and 12. In the circuit shown in FIG. 7, the resistance value of the resistor 12 is changed. To this end, a series circuit of a resistor 201 and the collector-emitter path of a transistor 200 is connected in parallel to the resistor 12. The base of the transistor 200 is connected to the power source 15 through a resistor 202 and a switch 203. When the switch 203 is off, the transistor 200 is in a cut-off state, so that only the resistor 12 is connected between the terminals 1 and 3. When the switch 203 is turned on to energize the transistor 200, the resistor 201 is connected in parallel to the resistor 12, so that the resistance value between the terminals 1 and 3 becomes small. This causes the rotation speed of the motor to become low.

The internal resistance $R_M$ of the motor 10 may become large as the rotational speed of the motor increases. If the resistance value of the resistor 13 as a torque control resistor is set constant nevertheless the internal resistance $R_M$ has become large, the variation of the rotational speed of the motor increases. Therefore, when the rotation speed of the motor is increased by changing the resistance value of at least one of the resistors 12 and 11, it is preferable to increase the resistance value of the resistor 13.

The present invention is not limited to the abovementioned embodiments and application, but may be modified and changed without departing from the spirit and scope of the present invention.

What is claimed is:

1. A motor speed control system comprising a power supply terminal, first, second and third terminals, a reference terminal, a motor connected between said power supply terminal and said first terminal, a first resistor connected between said power supply terminal and said second terminal, a second resistor connected between said first and third terminals, a third resistor connected between said second and third terminals, a first transistor having a collector-emitter path connected between said first and reference terminals, a second transistor having a collector-emitter path connected between said second and reference terminals, an error amplifier having first and second input terminals and an output terminal which is connected to bases of said first and second transistors, means coupled between said first terminal and said first input terminal of said error amplifier for generating a reference voltage thereacross, and means for connecting said third terminal to said second input terminal of said error amplifier.

2. The system as claimed in claim 1, further comprising means for supplying a bias current to said generating means without flowing via said first resistor.

3. The system as claimed in claim 1, wherein said generating means comprises a band gap regulator producing a band gap voltage.

4. The system as claimed in claim 2, wherein said generating means comprises a resistor supplied with said bias current to produce a voltage drop thereacross, said voltage drop being employed as said reference voltage.

5. The system as claimed in claim 2, further comprising a third transistor having a collector-emitter path inserted between said second terminal and said collector-emitter path of said second transistor, the base of said third transistor being connected to said first input terminal of said error amplifier.

6. A circuit combination comprising a first transistor having a collector-emitter path connected between a first terminal and a reference terminal, a second transistor having a collector-emitter path connected between a second terminal and said reference terminal, an error amplifier having first and second input terminals and an output terminal which is connected in common to bases of said first and second transistors, a bias current source connected between a power terminal and said first input terminal of said error amplifier and producing a bias current, a reference voltage circuit connected between said first terminal and said first input terminal of said error amplifier and generating a reference voltage in response to said bias current, a motor connected between said first terminal and said power terminal, a first resistor connected between said second terminal and said power terminal, second and third resistors connected in series between said first and second terminals, and means for level-shifting a potential at the node of said second and third resistors to supply the level-shifted potential to said second input terminal of said error amplifier.

7. The circuit combination as claimed in claim 6, wherein said level shifting means comprises a third transistor and a current source, said third transistor having a base connected to said node, a collector connected to said power terminal and an emitter connected to said second input terminal of said error amplifier, and said current source connected between the emitter of said third transistor and said reference terminal.

8. An integrated circuit device for a motor speed control, comprising first, second, third, fourth and fifth terminals, first and second transistors each having a base, an emitter and a collector, first means for connecting the collector of said first transistor to said first terminal, second means for connecting the collector of said second transistor to said second terminal, third means for connecting the emitters of said first and second transistors to said fourth terminal, a differential amplifier having first and second input terminals and an output terminal, fourth means for connecting said output terminal of said differential amplifier to the bases of said first and second transistors, fifth means for connecting said first input terminal of said differential amplifier to said third terminal, a reference voltage circuit connected between said first terminal and said second input terminal of said differential amplifier, and a bias current source connected between said fifth terminal and said second input terminal of said differential amplifier.

9. The integrated circuit device as claimed in claim 8, wherein said second means comprises a third transistor having an emitter connected to the collector of said second transistor, a collector connected to said second terminal and a base connected to said second input terminal of said differential amplifier.

10. The integrated circuit device as claimed in claim 8, wherein said fifth means comprises a third transistor having a base connected to said third terminal, an emitter connected to said first input terminal of said differential amplifier and a collector connected to said fifth terminal.

* * * * *